(12) United States Patent
Jungnickel et al.

(10) Patent No.: US 11,382,409 B2
(45) Date of Patent: Jul. 12, 2022

(54) CONNECTOR FOR A MANUAL ORAL CARE IMPLEMENT

(71) Applicant: The Gillette Company LLC, Boston, MA (US)

(72) Inventors: Uwe Jungnickel, Königstein (DE); Jens Alinski, Kelkheim (DE)

(73) Assignee: The Gillette Company LLC, Boston, MA (US)

(*) Notice: Subject to any disclaimer, the term of this patent is extended or adjusted under 35 U.S.C. 154(b) by 0 days.

(21) Appl. No.: 16/272,422

(22) Filed: Feb. 11, 2019

(65) Prior Publication Data

US 2019/0246780 A1 Aug. 15, 2019

(30) Foreign Application Priority Data

Feb. 9, 2018 (EP) ..................................... 18156005

(51) Int. Cl.
| | | |
|---|---|---|
| *A46B 5/00* | (2006.01) | |
| *A46B 7/04* | (2006.01) | |
| *A46B 13/08* | (2006.01) | |
| *A46B 15/00* | (2006.01) | |
| *A61C 17/00* | (2006.01) | |
| *H01R 13/627* | (2006.01) | |
| *A61C 17/22* | (2006.01) | |
| *A46B 9/04* | (2006.01) | |

(52) U.S. Cl.
CPC .............. *A46B 5/0095* (2013.01); *A46B 7/04* (2013.01); *A46B 13/08* (2013.01); *A46B 15/0044* (2013.01); *A61C 17/00* (2013.01); *A61C 17/222* (2013.01); *H01R 13/6276* (2013.01); *A46B 9/04* (2013.01); *A46B 2200/1066* (2013.01); *A61C 17/225* (2013.01); *H01R 2201/12* (2013.01)

(58) Field of Classification Search
CPC ......... A46B 5/0095; A46B 7/04; A46B 13/08; A46B 15/0044; A61C 17/00; A61C 17/22; H01R 13/6276
USPC .......................... 15/176.1, 145, 176.6, 167.1
See application file for complete search history.

(56) References Cited

U.S. PATENT DOCUMENTS

| | | | |
|---|---|---|---|
| 3,927,435 A | 12/1975 | Moret | |
| 4,384,645 A | 5/1983 | Manfredi | |
| 4,811,445 A | 3/1989 | Lagieski et al. | |
| 5,109,563 A | 5/1992 | Lemon et al. | |
| 5,335,389 A | 8/1994 | Curtis et al. | |

(Continued)

FOREIGN PATENT DOCUMENTS

| | | |
|---|---|---|
| CN | 2320102 | 5/1999 |
| CN | 1223834 | 7/1999 |

(Continued)

OTHER PUBLICATIONS

European Search Report, dated Jul. 12, 2018, 8 pages.

(Continued)

*Primary Examiner* — Katina N. Henson
(74) *Attorney, Agent, or Firm* — Vladimir Vitenberg (57) ABSTRACT

A connector for repeatedly attaching and detaching a head to and from a handle of a manual oral care implement has an outer surface and a recess. The recess forms a cavity within the connector, wherein the cavity comprises a spring-loaded ball-snap element, the element comprising a ball and a spring, the spring applying a radial force onto the ball in a direction towards the outer surface of the connector.

14 Claims, 6 Drawing Sheets

(56) References Cited

U.S. PATENT DOCUMENTS

| | | |
|---|---|---|
| 5,361,446 A | 11/1994 | Rufo |
| 5,369,835 A | 12/1994 | Clarke |
| 5,875,510 A | 3/1999 | Lamond et al. |
| 5,956,796 A | 9/1999 | Lodato |
| 6,015,328 A | 1/2000 | Glaser |
| 6,086,373 A | 7/2000 | Schiff |
| 6,230,716 B1 * | 5/2001 | Minoletti .......... A45D 6/04 132/120 |
| 6,308,367 B1 | 10/2001 | Beals et al. |
| 6,643,886 B2 | 11/2003 | Moskovich |
| 6,671,919 B2 | 1/2004 | Davis |
| 6,871,373 B2 | 3/2005 | Driesen |
| 7,137,166 B1 | 11/2006 | Kraemer |
| 8,387,197 B2 | 3/2013 | Moskovich |
| 8,563,020 B2 | 10/2013 | Uhlmann |
| 8,727,141 B2 | 5/2014 | Akalin |
| 8,931,855 B1 | 1/2015 | Foley et al. |
| 8,966,697 B2 | 3/2015 | Kim et al. |
| 9,049,921 B1 | 6/2015 | Rackston |
| 9,066,579 B2 | 6/2015 | Hess |
| 9,161,544 B2 | 10/2015 | Agrawal et al. |
| 9,168,117 B2 * | 10/2015 | Yoshida .......... A46B 5/0095 |
| 9,226,508 B2 | 1/2016 | Uhlmann et al. |
| 9,265,335 B2 | 2/2016 | Foley et al. |
| 9,402,461 B2 | 8/2016 | Brik et al. |
| 9,427,077 B1 | 8/2016 | Zhang |
| D775,469 S | 1/2017 | Sikora et al. |
| 9,539,750 B2 | 1/2017 | Gross et al. |
| 9,609,940 B2 | 4/2017 | Corbett |
| 9,642,682 B2 | 5/2017 | Kato |
| D814,195 S | 4/2018 | Sikora et al. |
| 10,195,005 B2 | 2/2019 | Wallström et al. |
| 10,667,892 B2 | 6/2020 | Bärtschi et al. |
| 10,792,136 B2 | 10/2020 | May et al. |
| D901,183 S | 11/2020 | Jungnickel et al. |
| D912,988 S | 3/2021 | Langhammer |
| D917,298 S | 4/2021 | Hallein et al. |
| D926,048 S | 7/2021 | Hallein et al. |
| D926,049 S | 7/2021 | Hallein et al. |
| D927,972 S | 8/2021 | Hallein et al. |
| D930,990 S | 9/2021 | Hallein et al. |
| D931,617 S | 9/2021 | Hallein et al. |
| D931,619 S | 9/2021 | Hallein et al. |
| D933,368 S | 10/2021 | Albay et al. |
| D936,484 S | 11/2021 | Hallein et al. |
| 2003/0115706 A1 | 6/2003 | Ponzini |
| 2004/0016073 A1 | 1/2004 | Knutson |
| 2004/0060138 A1 | 4/2004 | Pfenniger et al. |
| 2005/0022322 A1 | 2/2005 | Jimenez et al. |
| 2005/0268414 A1 | 12/2005 | Kim |
| 2005/0286967 A1 | 12/2005 | Blauzdys |
| 2006/0086370 A1 | 4/2006 | Omeara |
| 2008/0120795 A1 | 5/2008 | Reinbold |
| 2008/0220235 A1 | 9/2008 | Izumi |
| 2009/0089950 A1 | 4/2009 | Moskovich et al. |
| 2010/0115724 A1 | 5/2010 | Huang |
| 2010/0282274 A1 | 11/2010 | Huy |
| 2011/0016651 A1 | 1/2011 | Piserchio |
| 2011/0146015 A1 | 6/2011 | Moskovich |
| 2012/0036663 A1 | 2/2012 | Chen |
| 2012/0073072 A1 | 3/2012 | Moskovich et al. |
| 2012/0090117 A1 | 4/2012 | Akalin |
| 2012/0198640 A1 | 8/2012 | Jungnickel et al. |
| 2012/0227200 A1 | 9/2012 | Kraemer |
| 2012/0301528 A1 | 11/2012 | Uhlmann |
| 2012/0301530 A1 | 11/2012 | Uhlmann et al. |
| 2012/0301531 A1 | 11/2012 | Uhlmann et al. |
| 2012/0301533 A1 | 11/2012 | Uhlmann et al. |
| 2013/0000059 A1 | 1/2013 | Jungnickel et al. |
| 2013/0171225 A1 | 7/2013 | Uhlmann et al. |
| 2013/0291326 A1 | 11/2013 | Mintel |
| 2013/0315972 A1 | 11/2013 | Krasnow et al. |
| 2014/0137349 A1 | 5/2014 | Newman |
| 2014/0259474 A1 | 9/2014 | Sokol et al. |
| 2014/0359957 A1 | 12/2014 | Jungnickel |
| 2014/0359958 A1 | 12/2014 | Jungnickel |
| 2015/0034858 A1 | 2/2015 | Raman |
| 2015/0143651 A1 | 5/2015 | Foley et al. |
| 2015/0147372 A1 | 5/2015 | Agrawal et al. |
| 2015/0245618 A9 | 9/2015 | Agrawal et al. |
| 2015/0289635 A1 | 10/2015 | Erskine-Smith |
| 2015/0305487 A1 | 10/2015 | Pardo et al. |
| 2015/0351406 A1 | 12/2015 | Wingfield et al. |
| 2016/0135579 A1 | 5/2016 | Tschol et al. |
| 2016/0135580 A1 | 5/2016 | Tschol et al. |
| 2016/0220014 A1 | 8/2016 | Sprosta |
| 2017/0079418 A1 | 3/2017 | Mintel |
| 2017/0347782 A1 | 12/2017 | Jimenez et al. |
| 2017/0347786 A1 | 12/2017 | Jimenez et al. |
| 2017/0367469 A1 | 12/2017 | Jimenez et al. |
| 2018/0016408 A1 | 1/2018 | Stibor |
| 2018/0055206 A1 | 3/2018 | Nelson et al. |
| 2018/0311023 A1 | 11/2018 | Yao |
| 2019/0000223 A1 | 1/2019 | Alinski |
| 2019/0069978 A1 | 3/2019 | Katano et al. |
| 2019/0117356 A1 | 4/2019 | Bartschi et al. |
| 2019/0200740 A1 | 7/2019 | Jungnickel |
| 2019/0200742 A1 | 7/2019 | Jungnickel |
| 2019/0200743 A1 | 7/2019 | Jungnickel |
| 2019/0200748 A1 | 7/2019 | Görich |
| 2019/0246779 A1 | 8/2019 | Jungnickel et al. |
| 2019/0246781 A1 | 8/2019 | Jungnickel et al. |
| 2019/0248049 A1 | 8/2019 | Jungnickel et al. |
| 2020/0022793 A1 | 1/2020 | Scherrer et al. |
| 2020/0077778 A1 | 3/2020 | Jungnickel |
| 2020/0121069 A1 | 4/2020 | Jungnickel |
| 2020/0305588 A1 | 10/2020 | Jungnickel |
| 2021/0120948 A1 | 4/2021 | Görich et al. |
| 2021/0128286 A1 | 5/2021 | Jungnickel et al. |
| 2021/0212446 A1 | 7/2021 | Jungnickel |
| 2021/0212447 A1 | 7/2021 | Jungnickel et al. |
| 2021/0212448 A1 | 7/2021 | Jungnickel |
| 2021/0220101 A1 | 7/2021 | Jungnickel et al. |
| 2021/0259818 A1 | 8/2021 | Jungnickel et al. |
| 2021/0307496 A1 | 10/2021 | Jungnickel et al. |
| 2021/0315368 A1 | 10/2021 | Jungnickel |
| 2021/0315369 A1 | 10/2021 | Jungnickel |
| 2021/0315370 A1 | 10/2021 | Jungnickel |
| 2021/0315675 A1 | 10/2021 | Jungnickel |

FOREIGN PATENT DOCUMENTS

| | | |
|---|---|---|
| CN | 1229341 A | 9/1999 |
| CN | 1229622 | 9/1999 |
| CN | 2346277 | 11/1999 |
| CN | 1241123 A | 1/2000 |
| CN | 201036392 | 3/2008 |
| CN | 201185740 | 1/2009 |
| CN | 201563874 U | 9/2010 |
| CN | 201630520 | 11/2010 |
| CN | 201675294 | 12/2010 |
| CN | 201861064 | 6/2011 |
| CN | 201861068 | 6/2011 |
| CN | 202035662 | 11/2011 |
| CN | 202269590 U | 6/2012 |
| CN | 202286879 | 7/2012 |
| CN | 202476817 | 10/2012 |
| CN | 102907880 | 2/2013 |
| CN | 102948997 | 3/2013 |
| CN | 103829559 | 3/2013 |
| CN | 202820100 | 3/2013 |
| CN | 202941615 | 5/2013 |
| CN | 202980745 | 6/2013 |
| CN | 103844575 | 11/2014 |
| CN | 105054571 | 11/2015 |
| CN | 205082879 | 3/2016 |
| CN | 105534002 | 5/2016 |
| CN | 105750734 | 7/2016 |
| CN | 105818322 | 8/2016 |
| CN | 205568222 | 9/2016 |
| CN | 206714397 | 12/2017 |
| CN | 207055161 | 3/2018 |
| CN | 109259882 A | 1/2019 |
| CN | 111713845 A | 9/2020 |

(56) References Cited

FOREIGN PATENT DOCUMENTS

| | | |
|---|---|---|
| DE | 3241118 A1 | 8/1984 |
| DE | 202005002964 | 7/2005 |
| DE | 202006019788 | 8/2007 |
| DE | 102006051649 | 5/2008 |
| DE | 202015002964 U1 | 8/2015 |
| EP | 0100975 A2 | 2/1984 |
| EP | 0481553 A1 | 4/1992 |
| EP | 2117395 A2 | 11/2009 |
| EP | 2218559 A1 | 8/2010 |
| EP | 3090646 | 11/2016 |
| EP | 3381404 A1 | 10/2018 |
| EP | 3501333 A1 | 6/2019 |
| FR | 2835176 | 8/2003 |
| GB | 766486 | 1/1957 |
| GB | 2493409 | 2/2013 |
| JP | 61020509 | 1/1986 |
| JP | S63284262 | 11/1988 |
| JP | H0669408 | 3/1994 |
| JP | 2561978 | 12/1996 |
| JP | 2619825 | 6/1997 |
| JP | 2002512540 | 4/2002 |
| JP | 2003009951 | 1/2003 |
| JP | 2003245132 | 9/2003 |
| JP | 2004089471 | 3/2004 |
| JP | 2005053973 | 3/2005 |
| JP | 4076405 | 2/2008 |
| JP | 2009011621 | 1/2009 |
| JP | 2011045621 | 3/2011 |
| JP | 2011087747 | 5/2011 |
| JP | 3213325 | 11/2017 |
| KR | 20070013844 | 1/2007 |
| KR | 20090030829 | 3/2009 |
| KR | 101142611 | 5/2012 |
| KR | 20130006243 U | 10/2013 |
| KR | 101339558 | 12/2013 |
| KR | 200473116 | 6/2014 |
| KR | 20150057308 | 5/2015 |
| KR | 20150105813 | 9/2015 |
| KR | 101591299 | 2/2016 |
| KR | 20160125725 | 11/2016 |
| KR | 20170062779 | 6/2017 |
| KR | 101847473 B1 | 4/2018 |
| KR | 200486759 Y1 | 6/2018 |
| KR | 101987341 B1 | 6/2019 |
| RU | 2141238 | 11/1999 |
| TW | 431151 | 1/2001 |
| WO | WO9510959 | 4/1995 |
| WO | WO9838889 | 9/1998 |
| WO | 9844823 A2 | 10/1998 |
| WO | 2005002826 A1 | 1/2005 |
| WO | WO2005030002 | 4/2005 |
| WO | WO200641658 | 4/2006 |
| WO | 2008098107 A2 | 8/2008 |
| WO | 2009045982 A1 | 4/2009 |
| WO | 2012126126 | 9/2012 |
| WO | WO2012144328 | 10/2012 |
| WO | WO2013076904 | 5/2013 |
| WO | 2013101300 A1 | 7/2013 |
| WO | 2013158741 | 10/2013 |
| WO | 2014193621 | 12/2014 |
| WO | 2015061651 A1 | 4/2015 |
| WO | 2016189407 A1 | 12/2016 |
| WO | 2017173768 A1 | 10/2017 |
| WO | 2018025751 | 2/2018 |
| WO | 2019072925 A1 | 4/2019 |
| WO | 2019157787 A1 | 8/2019 |

OTHER PUBLICATIONS

All Office Actions, U.S. Appl. No. 16/272,392.
All Office Actions, U.S. Appl. No. 16/272,872.
All Office Actions, U.S. Appl. No. 16/272,943.
All Office Actions; U.S. Appl. No. 16/225,592.
All Office Actions; U.S. Appl. No. 16/225,688.
All Office Actions; U.S. Appl. No. 16/225,809.
All Office Actions; U.S. Appl. No. 16/225,509.
Extended European Search Report and Search Opinion; Application No. 17208870.0; dated Jun. 26, 2018; 8 pages.
Extended European Search Report and Search Opinion; Application No. 17208874.2; dated Feb. 9, 2018; 9 pages.
Extended European Search Report and Search Opinion; Application No. 17208951.8; dated Feb. 19, 2018 ; 6 pages.
Extended European Search Report and Search Opinion; Application No. 17208954.2; dated Feb. 15, 2018; 8 pages.
Extended European Search Report and Search Opinion; Application No. 18155967.5; dated Jul. 20, 2018, 7 pages.
Extended European Search Report and Search Opinion; Application No. 18156035.0; dated Aug. 1, 2018, 7 pages.
Extended European Search Report and Search Opinion; Application No. 18156000.4; dated Jul. 20, 2018, 8 pages.
International Search Report and Written Opinion; Application Ser. No. PCT/US2018/065317; dated Jan. 29, 2019, 13 pages.
International Search Report and Written Opinion; Application Ser. No. PCT/US2018/065395; dated Mar. 11, 2019, 11 pages.
International Search Report and Written Opinion; Application Ser. No. PCT/US2018/065599; dated Feb. 12, 2019, 15 pages.
International Search Report and Written Opinion; Application Ser. No. PCT/US2018/1065600; dated Feb. 20, 2019, 13 pages.
International Search Report and Written Opinion; Application Ser. No. PCT/US2019/016212; dated May 24, 2019, 10 pages.
International Search Report and Written Opinion; Application Ser. No. PCT/US2019/016214; dated May 29, 2019, 10 pages.
International Search Report and Written Opinion; Application Ser. No. PCT/US2019/016215; dated May 24, 2019, 11 pages.
International Search Report and Written Opinion; Application Ser. No. PCT/US2019/016216; dated Apr. 25, 2019, 8 pages.
Unpublished U.S. Appl. No. 17/077,639, filed Oct. 22, 2020, to Goerich Gerald et. al.
All Office Actions; U.S. Appl. No. 16/551,307, filed Aug. 26, 2019.
All Office Actions; U.S. Appl. No. 16/551,399, filed Aug. 26, 2019.
All Office Actions; U.S. Appl. No. 17/077,639, filed Oct. 22, 2020.
All Office Actions; U.S. Appl. No. 17/090,980, filed Jun. 11, 2020.
All Office Actions; U.S. Appl. No. 17/155,167, filed Jan. 22, 2021.
All Office Actions; U.S. Appl. No. 17/155,208, filed Jan. 22, 2021.
All Office Actions; U.S. Appl. No. 17/218,573, filed Mar. 31, 2021.
All Office Actions; U.S. Appl. No. 17/218,742, filed Mar. 31, 2021.
All Office Actions; U.S. Appl. No. 17/219,989, filed Apr. 1, 2021.
All Office Actions; U.S. Appl. No. 17/225,259, filed Apr. 8, 2021.
All Office Actions; U.S. Appl. No. 17/225,283, filed Apr. 8, 2021.
All Office Actions; U.S. Appl. No. 17/225,296, filed Apr. 8, 2021.
All Office Actions; U.S. Appl. No. 17/225,411, filed Apr. 8, 2021.
All Office Actions; U.S. Appl. No. 17/354,027, filed Jun. 22, 2021.
All Office Actions; U.S. Appl. No. 17/462,089, filed Aug. 31, 2021.
All Office Actions; U.S. Appl. No. 16/829,585, filed Mar. 25, 2020.
Unpublished U.S. Appl. No. 17/462,089, filed Oct. 31, 2021, to first inventor et. al.
All Office Actions; U.S. Appl. No. 17/511,103, filed Oct. 26, 2021.
All Office Actions; U.S. Appl. No. 17/517,928, filed Nov. 3, 2021.
All Office Actions; U.S. Appl. No. 17/517,937, filed Nov. 3, 2021.
All Office Actions; U.S. Appl. No. 17/517,957, filed Nov. 3, 2021.
All Office Actions; U.S. Appl. No. 17/517,975, filed Nov. 3, 2021.
All Office Actions; U.S. Appl. No. 17/517,990, filed Nov. 3, 2021.
All Office Actions; U.S. Appl. No. 17/517,999, filed Nov. 3, 2021.
All Office Actions; U.S. Appl. No. 17/518,009, filed Nov. 3, 2021.
Unpublished U.S. Appl. No. 17/511,103, filed Oct. 26, 2021, to first inventor et. al.
Unpublished U.S. Appl. No. 17/517,928, filed Nov. 3, 2021, to first inventor et. al.
Unpublished U.S. Appl. No. 17/517,937, filed Nov. 3, 2021, to first inventor et. al.
Unpublished U.S. Appl. No. 17/517,957, filed Nov. 3, 2021, to first inventor et. al.
Unpublished U.S. Appl. No. 17/517,975, filed Nov. 3, 2021, to first inventor et. al.
Unpublished U.S. Appl. No. 17/517,990, filed Nov. 3, 2021, to first inventor et. al.

(56) References Cited

OTHER PUBLICATIONS

Unpublished U.S. Appl. No. 17/517,999, filed Nov. 3, 2021, to first inventor et. al.
Unpublished U.S. Appl. No. 17/518,009, filed Nov. 3, 2021, to first inventor et. al.

* cited by examiner

CONNECTOR FOR A MANUAL ORAL CARE IMPLEMENT

FIELD OF THE INVENTION

The present disclosure is concerned with a connector for repeatedly attaching and detaching a head to and from a handle of a manual oral care implement. The present disclosure is further concerned with a handle of a manual oral care implement, the handle comprising such connector, and a manual oral care implement comprising such handle and a head.

BACKGROUND OF THE INVENTION

Heads and handles for oral care implements, like manual toothbrushes, are well known in the art. Generally, tufts of bristles or other cleaning elements for cleaning teeth and soft tissue in the mouth are attached to a bristle carrier or mounting surface of the brush head intended for insertion into a user's oral cavity. The handle is usually attached to the head, which handle is held by a user during brushing. Usually, heads of manual toothbrushes are permanently connected to the handle, e.g. by injection molding the bristle carrier, the handle, a neck connecting the head and the handle, in one injection molding step. After the usual lifetime of a toothbrush, i.e. after about three months of usage, the toothbrush is discarded. In order to provide environmentally friendly/sustainable manual toothbrushes generating less waste when the brushes are discarded, manual toothbrushes are known comprising heads or head refills being exchangeable, i.e. repeatedly attachable to and detachable from the handle. Instead of buying a completely new toothbrush, consumers can re-use the handle and buy a new head refill only. Such refills are usually less expensive and generate less waste than a conventional manual toothbrush.

For example, manual toothbrushes are known comprising a handle to which a replaceable head is connected. The handle is provided with a cavity within which the head is insertable. To provide sufficiently strong connection between the head and the handle, the brush head is formed with a neck having a coupling anchor with a number of recesses for engaging in a complementary engaging mechanism within a collar of the handle.

However, such anchor/engaging mechanism has a relatively complex outer geometry which is not easy to clean after usage of the toothbrush. Toothpaste and slurry may accumulate in recesses of the anchor/engaging mechanism and may prevent the brush head to be accurately attachable to the handle. Further, such engaging mechanism does not provide the toothbrush with sufficient anti-twist protection for the brush head on the handle during brushing.

Further, connector solutions featuring small plastic hooks that interact with respective apertures are known. However, these plastic hooks relax over time and the user needs to actively push back the hooks in parallel to pulling the refill in order to remove the brush head from the handle. Such connector solution is neither intuitive nor consumer friendly. Furthermore, such connectors are not easy to clean. Moreover, engaging parts provided in the brush refill are necessary which results in additional manufacturing costs and complexity.

If the head is not accurately attached/fixed on the handle, for example because the connector is not sufficiently clean as slurry and toothpaste accumulated in small recesses, and/or if the brush head twists away during brushing, the maneuverability of the oral care implement during brushing is poor, impeding the user reaching all areas in the oral cavity. Consequently, maneuverability of the overall brush may not be sufficient. However, in order to achieve and preserve good oral health, and to prevent gingivitis, it is important to clean teeth and gums thoroughly, in particular in hard to reach areas, e. g. in the region of the back molars. Further, gaps between teeth and periodontium, the so called gingival groove has to be thoroughly cleaned which requires a good and well-coordinated brushing technique, which may not be achievable by using the above-mentioned manual toothbrushes.

It is an object of the present disclosure to provide a connector, a handle comprising such connector and an oral care implement which overcomes at least one of the above-mentioned drawbacks, in particular an oral care implement which comprises an exchangeable brush head which is sufficiently strong connectable to a handle and which does not rotate/twist aside during brushing.

SUMMARY OF THE INVENTION

In accordance with one aspect a connector for repeatedly attaching and detaching a head to and from a handle of a manual oral care implement is provided, connector having an outer lateral surface and a recess therein, the recess forming a cavity within the connector, wherein the cavity comprises a spring-loaded ball-snap element, the element comprising a ball and a spring, the spring applying a radial force onto the ball in a direction towards the outer lateral surface of the connector.

In accordance with one aspect, a handle for a manual oral care implement is provided, the handle comprising such connector.

In accordance with one aspect, a manual oral care implement is provided, the implement comprising a head, preferably a brush head, and a handle according to the present disclosure, the head being repeatedly attachable to and detachable from the handle via a connector according to the present disclosure.

BRIEF DESCRIPTION OF THE DRAWINGS

The invention is described in more detail below with reference to various embodiments and figures, wherein.

DETAILED DESCRIPTION OF THE INVENTION

The manual oral care implement according to the present disclosure comprises a handle and a head on which at least one tooth and/or tissues cleaning element, e.g. a tuft of bristles and/or an elastomeric element, is fixed. The head is repeatedly attachable to and detachable from the handle. The oral care implement may be a manual toothbrush, or alternatively an inter-proximal pick, a plaque scraper or tissue/tongue cleanser.

The head of the oral care implement is attachable to the handle via a connector which provides a snap-fit locking mechanism to ensure sufficiently strong connection and stability between the head and the handle, e.g. to enable a user to perform a brushing action. The connector has an outer lateral surface and a recess therein, the recess forming a cavity within the connector. Within the cavity a spring-loaded ball-snap element is provided. The spring-loaded ball-snap element comprises a ball and a spring, the spring applying a radial force onto the ball in a direction towards the outer lateral surface of the connector. In the following a radial force is defined by a force applied in a direction being substantially perpendicular to the longitudinal length extension of the connector. The spring applies a force onto the ball and pushes the ball outwards so that the ball extends slightly beyond the outer lateral surface of the connector. An inner wall of a hollow portion provided in the head may comprise a recess for receiving the ball of the spring-loaded ball element. Once the head is snap-fitted onto the connector, the head is fixed on the handle/connector in an axial direction. In other words, the connector and the oral care implement comprising such connector, respectively, allow for easy attachment/detachment of the head to and from the handle. The user can attach the brush head to the handle by a simple linear motion. Further, the ball-snap provides a precise fixation of the brush head, and a distinct haptic feedback is given to the user that the head is snapped-on securely. In other words, the user recognizes once the ball engages into the recess provided in the inner wall of the hollow portion of the head. The brush head can be easily removed, i.e. without performing a synchronized action with other elements/unlocking mechanisms.

The head is fixed on the handle until a specific/predetermined pull-off force is applied. The connection between the head and connector is sufficiently strong enabling well-coordinated brushing techniques. The head does not get loosened from the handle and does not twist aside during brushing.

The ball and/or the spring of the spring-loaded ball element may be made from stainless steel. While typical snap elements comprise a spring element made from plastic that shows relaxation and aging effects over time, a stainless steel spring shows a constant spring rate over time, also under extended use conditions (e.g. temperature). A spring-loaded ball element made from stainless steel may provide long-lasting, reliable fixation of the head on the connector/handle. Moreover, if the spring-loaded ball snap element is made completely from stainless steel, an electrical contact from the handle to the refill can be easily realized. In order to provide a closed electric circuit, an electrical conductive ring at the proximal end of the handle can be attached as a second contact. An electrical contact from the handle to the refill allows for various additional functions, e.g. light for diagnostics or treatment, e.g. for iontophoresis.

The spring-loaded ball element may be fixed in the cavity by a press-fitting process and/or gluing.

The connector may comprise a first substantially cylindrical section and a second substantially cylindrical section, wherein the first and the second cylindrical sections may be connected by an at least partially conically shaped section. The first substantially cylindrical section, the at least partially conically shaped section and the second substantially cylindrical section may be arranged in consecutive order and may define a longitudinal length extension of the connector. The first and the second substantially cylindrical sections may be placed off-center with respect to the longitudinal length extension of the connector.

In the following, a substantially cylindrical section is defined by a three-dimensional body having a longitudinal length extension and a cross-sectional area extending substantially perpendicular to the longitudinal length extension. The cross-sectional area has a shape being substantially constant along the longitudinal length extension. Since the connector may be manufactured by an injection molding process, a substantially cylindrical section also comprises sections/bodies which have a slight draft angle of up to 2°. In other words, a substantially cylindrical section also comprises a section/body which tapers slightly by up to 2° towards a proximal end which is closest to the head once the head is attached to the connector.

The cross-sectional area may have any shape, for example substantially circular, ellipsoid, rectangular, semi-circular, circular with a flattening portion, convex or concave. The cross-sectional area may have the shape of a polygon, for example of a square or triangle. The outer lateral surface circumventing the cylinder along its length extension can be defined as being composed of straight lines which are substantially parallel with respect to the longitudinal length extension of the cylinder.

The head of the oral care implement has a distal end and a proximal end, the proximal end being defined as the end closest to the handle. The proximal end of the head may comprise a hollow portion for receiving a part of the connector, for example, the second substantially cylindrical section, the at least partially conically shaped section and a part of the first substantially cylindrical section. The hollow portion of the head may have an inner wall with a geometry/contour which corresponds to the outer geometry/contour of the part of the connector to be inserted into the hollow portion of the head. The eccentric arrangement/off-center positioning of the substantially cylindrical sections of the connector enables precise positioning of the brush head on the handle. The geometric position of the head can be clearly defined. As the handle comprises the connector at a proximal end being closest to the head, the eccentric/off-center arrangement of the two substantially cylindrical sections may act as a guidance element when a user attaches the head to the handle. In other words, the two substantially cylindrical sections may allow for accurate fitting between the head and the handle. Further, the eccentric/off-center arrangement of the two substantially cylindrical sections may provide an anti-twist protection for the head on the handle during brushing, for example if a lateral force is applied onto the head.

The first substantially cylindrical section and the second substantially cylindrical section have a length extension and a cross-sectional area extending substantially perpendicular to the length extension, and the cross-sectional area of the first substantially cylindrical section and/or second of the second substantially cylindrical section may be substantially circular. Such geometry provides a robust and simple structure which is easy to clean after usage of the oral care implement. Further, since the outer geometry is relatively simple, such connector can be manufactured in a cost-efficient manner.

The first substantially cylindrical section may have a cross-sectional area being greater than the cross-sectional area of the second substantially cylindrical section. For example, the first substantially cylindrical section to be inserted into a hollow portion at the proximal end of the handle, may have a substantially circular cross-sectional area with a diameter of about 8 mm to about 10 mm, preferably about 9 mm, while the second substantially cylindrical section to be inserted into a hollow portion at the proximal end of the head, may have a substantially circular cross-sectional area with a diameter of about 4 mm to about 6 mm, preferably about 5 mm.

The first and the second substantially cylindrical sections may have a first and a second longitudinal central axis, respectively which are defined as the symmetry axis of the first and the second substantially cylindrical sections. The first and the second substantially cylindrical sections may be placed/arranged with respect to each other so that the second longitudinal central axis of the second cylindrical section is located off-center with respect to the first longitudinal central axis of the first cylindrical section by about 1 mm to about 2.5 mm, or by about 1.5 mm to about 2 mm, or by about 1.65 mm. In other words, the center of the second substantially cylindrical section is offset/eccentric from the longitudinal central axis of the first substantially cylindrical section by a distance of about 1 mm to about 2.5 mm, or of about 1.5 mm to about 2 mm, or of about 1.65 mm.

Such connector may be easy to manufacture, e.g. by injection molding, and provides sufficient torsional stability for the oral care implement if lateral forces are applied onto the brush head.

The first and/or the second substantially cylindrical section may comprise a flattening portion extending along the length extension of the first and/or second substantially cylindrical section. Such flattening portion may provide the toothbrush with additional anti-twist protection for the head being connected to the handle during brushing, for example if a lateral force is applied onto the head.

The first and the second substantially cylindrical sections have a first and a second outer surface, respectively, and the first and the second substantially cylindrical sections may be arranged with respect to each other so that a part of the first outer surface and a part the second outer surfaces are substantially in straight alignment. The flattening portion, optionally comprising the spring-loaded ball element, may be arranged opposite the first and second outer surfaces being substantially in straight alignment. Such connector has an easy to clean outer geometry. The connector is robust, easy to use, and can be manufactured in a cost-efficient manner.

The handle for the oral care implement has a distal end and a proximal end, the proximal end being opposite the distal end and closest to the head when the head is attached to the handle. The proximal end of the handle may comprise a hollow portion/recess into which a part of the first substantially cylindrical section is fixed, e.g. by a press-fitting process and/or gluing. If the connector forms a part of the handle, the connector—representing a relatively expensive part of the overall oral care implement—can be used over an extended/longer period of time. The head having a relatively simple structure and being relatively cheap as compared to the handle comprising the connector, can be replaced every three months. A new head refill can be purchased at relatively low costs. While replaceable brush heads according to the state of the art consist out of an assembly of multiple parts or comprise at least one additional insert, the frequently exchangeable brush heads for the oral care implement according to the present disclosure can be produced at lower costs.

The proximal end of the handle may comprise a chamfered surface. Such chamfered surface may provide the oral care implement with additional anti-twist protection during use. The chamfered surface and a cross-sectional area of the handle may define an angle $\alpha$ from about 15° to about 30°, or from about 18° to about 28°, or about 25°. Said cross-sectional area is defined by an area extends substantially perpendicular to the longitudinal length extension of the handle. Surprisingly, it has been found out that such angled/chamfered surface provides superior anti-twist protection. Furthermore, the angled/chamfered surface allows for draining-off fluids, like toothpaste slurry and saliva, after use of the oral care implement, thereby preventing accumulation of such fluids over time.

The connector and the oral care implement comprising such connector, respectively, allow for easy attachment/detachment of the head to and from the handle. The user can attach the head to the handle by a simple linear motion. With the specific design of the substantially cylindrical sections being arranged off-center, and the chamfered surface of the handle, the head is turned into the right orientation automatically during the attachment motion (within certain tolerances). Therefore, the consumer is not forced to precisely position the head on the handle before snapping it on. Further, the ball-snap provides a precise fixation of the brush head, and a distinct haptic feedback is given to the consumer that the head is snapped-on securely. The brush head can be easily removed, without any synchronized action with other elements (unlocking mechanisms). In addition, the connector can be cleaned easily. The specific design of the connector may not have any recesses in which dirt, toothpaste and/or saliva accumulate. The connector may also avoid any fragile structures by comprising substantially round edges, only, which may prevent easy breakage or damage of the surfaces.

To allow sufficiently good fitting of the brush head on the connector if production tolerances occur, the inner wall of the hollow portion of the head may be formed with at least one rib, or two ribs being opposite each other, for precisely adjusting the head on the connector/handle. Furthermore, the at least one rib may prevent compression of air in the hollow portion of the head which could act like a spring or as additional resistance while snapping the head on the connector/handle.

At least a portion of the head, e. g. the neck/shaft and the bristle carrier may be at least partially made from a material having a density from about 0.5 g/cm$^3$ to about 1.2 g/cm$^3$, or from about 0.7 g/cm$^3$ to about 1.0 g/cm$^3$, or about 0.9 g/cm$^3$. For example, the head may be injection molded from a thermoplastic polymer, e.g. polypropylene having a density of about 0.9 g/cm$^3$. In contrast to the head, the handle may be at least partially made from a material having a significant higher density, i.e. a density from about 2.1 g/cm$^3$ to about 3.1 g/cm$^3$, or from about 2.3 g/cm$^3$ to about 2.8 g/cm$^3$, or from about 2.5 g/cm$^3$ to about 2.7 g/cm$^3$.

The weight of the handle material may be relatively high, to provide a user with high-quality perception and comfortable feeling during use of the oral care implement. Usually users are accustomed that products, in particular in the personal health care sector, have a specific weight that guarantees high product quality and provides comfortable feeling during use of the product. Consequently, such oral care implement provides such superior product quality perception.

Further, since the material of the handle may have a higher density than the material of the head, the center of mass/center of gravity lies within the handle (even if the brush head is loaded with toothpaste) which enables users to perform a well-coordinated brushing technique with improved sensory feeling during brushing. The center of gravity provided in the center of the handle may provide an oral care implement which is better balanced and does not tip over/does not get head loaded once toothpaste is applied onto the brush head. When users apply different grip styles/brushing techniques, the oral care implement according to the present disclosure has the advantage that the center of gravity is in or very close to the pivot point of the wrist joint. A balanced toothbrush is easier to control in the mouth, thereby allowing more precise and accurate brushing movements which enables better cleaning.

While the high quality and relatively expensive handle of the oral care implement may be adapted for use over a longer period of time as compared to common manual toothbrushes which are discarded after about three months of use, the relatively cheap brush refill can be exchanged on a regular basis, e.g. after about three months. This provides a cost-efficient and environmentally sustainable high quality oral care implement with improved handling properties.

In the past, it has been seen that after use of the brush/after brushing the teeth the user usually stores the wet brush in a toothbrush beaker for drying. However, in a classical toothbrush beaker, drained fluids get collected and accumulated at the bottom of the beaker, and, the fluids stay in contact with the toothbrush for a longer period of time. Since the beaker is open on one side only, the toothbrush dries relatively slowly. Bacteria living in wet conditions/in a wet environment can grow quickly, contaminate the toothbrush and finally render the brush unhygienic. Consequently, there exists a need for a solution for hygienically storing and drying a manual toothbrush, thereby enabling remaining water, toothpaste slurry and saliva to drain off from the brush. The brush shall dry quickly thereby inhibiting bacterial growth.

The material of the head may be made of a non-magnetic or non-ferromagnetic material, while the material of the handle may be made from a magnetic and/or ferromagnetic material. Magnetic/ferromagnetic material possesses not only a relatively high density, and, thus, a relatively heavy weight, which may provide the oral care implement with the above-mentioned benefits, but the magnetic/ferromagnetic material also enables the oral care implement to be magnetically attachable to a magnetic holder. The magnetic/ferromagnetic material of the handle may allow for hygienic storage of the oral care implement. If the oral care implement is magnetically attached to a magnetic holder, remaining water, toothpaste slurry and saliva can drain off from the brush. The oral care implement can dry relatively quickly. Consequently, bacteria growth can significantly be reduced, thereby rendering the oral care implement more hygienic. In contrast to a common toothbrush being stored in a toothbrush beaker where drained fluids get collected and accumulated at the bottom of the beaker, the brush according to the present disclosure is exposed to wet conditions over a significantly shorter period of time.

For example, the magnetic holder may have the form of a flat disk attachable to a wall. Such flat disk may represent an easy to clean surface. Further, a user just needs to bring the oral care implement in close proximity to the magnetic holder, and then the oral care implement gets attached automatically. No precise positioning or threading as in common toothbrush holder is required. Since the magnetic properties are merely provided in the handle, and not in the head, the head portion cannot accidentally be attached to the magnetic holder, thereby reducing the risk that the magnetic holder gets soiled.

The magnetic and/or ferromagnetic material forming at least a part of the handle may comprise an amorphous thermoplastic resin. The magnetic and/or ferromagnetic material may further comprise aluminum oxide, boron nitride or aluminum silicate. Furthermore, the magnetic and/or ferromagnetic material may comprise in addition or alternatively iron oxide. The magnetic and/or ferromagnetic material may further comprise glass fibers which may be pre-mixed with at least a portion of the amorphous thermoplastic resin. Such handle material allows for control of the weight of the handle in whatever location, e.g. by filler variation. Control of the overall toothbrush is required due to the relatively high weight of the handle. It is now possible to use the mass/weight distribution of the material for adaption of the inertial moment of the finished toothbrush.

The magnetic and/or ferromagnetic material may comprise from about 13 weight percent to about 30 weight percent of an amorphous thermoplastic resin; from about 3 weight percent to about 25 weight percent of aluminum oxide, boron nitride or aluminum silicate; and from about 45 weight percent to about 67 weight percent of iron oxide. Such composition provides a material density that is about three times the density of a standard plastic material used for toothbrushes, e.g. polypropylene. With higher weight and higher thermal conductivity, the material drives value perception, in particular in combination with a galvanic coating. Such coating may be made from real metal. The galvanic coating can be applied in a selective electroplating process. During this coating process for a multicomponent plastic part, a metallic layer is only deposited on a hard material while a further over molded soft component may remain unaffected.

The magnetic and/or ferromagnetic material may comprise about 27.5 weight percent of an amorphous thermoplastic resin, about 17 weight percent of aluminum oxide, about 51 weight percent of iron oxide, and about 4.5% glass fiber.

The amorphous thermoplastic resin may comprise a styrene resin, e.g. styrene acrylonitrile "SAN". The amorphous thermoplastic resin may be selected from the list consisting of acrylonitrile butadiene styrene, polystyrene, and styrene acrylonitrile.

The amorphous thermoplastic resin may comprise about 17% weight percent styrene acrylonitrile, and 10.5 weight percent of a mixture comprising polybutylene terephthalate and polyethylene terephthalate.

Surprisingly, it has been found out that said composition provides a high gravity molding material appropriate for injection molding or extrusion molding. A high specific gravity molding material high in surface hardness, excellent in coating characteristics as well as excellent in thermal conductivity is provided.

The use of molding materials having a relatively high specific gravity is known. Such molding materials usually contain a polymeric resin and a high-density filler such as iron oxide. However, in such molding materials the amount of iron oxide which can be included is limited as the thermal conductivity properties of the molding material are relatively poor. Thus, on the one side, lower thermal conductivity leads to relatively longer cycle times during manufacturing to allow the molding material to cool after molding. On the other side, if heavy polymeric materials are filled with high heat conductive additives such as metal powder or fibers, the addition of these materials leads to tight process windows in molding because of the immediate freezing when the molten material contacts the cold wall of the tool. This fast freezing leads to high injection speed and low flow length to wall thickness ratio at the produced part.

Now, it has been surprisingly found out that the molding material according to the present disclosure has a high specific gravity and optimally controlled thermal conductivity properties to reduce or expand the time needed for the molding material to cool during or after injection molding. Surprisingly, it has been found out that a relatively high percentage of iron oxide can be maintained in the molding material while improving on the thermal conductivity properties of the molding material. The addition of aluminum oxide, boron nitride or aluminum silicate provides the molding material with improved thermal conductivity as compared to materials containing a styrene resin and iron oxide only. This improved thermal conductivity may lead to lower cycle times as the molding material needs less time to cool after molding.

Another benefit of adding aluminum oxide, boron nitride or aluminum silicate to the material is the ability to increase the overall amount of iron oxide in the molding material as compared with materials comprising iron oxide and resins of the past. The improvements in the molding material properties come from the addition of relatively small amounts of aluminum oxide, boron nitride or aluminum silicate. A material composition comprising a relatively high percentage of iron oxide (magnetite), i.e. from about 45 weight percent to about 67 weight percent, preferably about 51 weight percent, provides good magnetic properties and a relatively heavy weight of the overall material.

Styrene acrylonitrile "SAN" provides high thermal resistance properties. The acrylonitrile units in the chain enable SAN to have a glass transition temperature greater than 100° C. The properties of SAN may allow for reduced cycle time due to relatively earlier and quicker transition temperature. Amorphous polymers are suitable for heavy resin compounds of the present disclosure due to the glass transition temperature Tg at which an amorphous polymer is transformed, in a reversible way, from a viscous or rubbery condition to a hard one. By injection molding of the heavy resin material of the present disclosure the temperature of the material melt is above the Tg region (viscous or rubbery condition). During cooling the compound attains the high Tg temperature early and reaches dimensional stability (glassy condition). Over-molding of the heavy resin material is possible as the material stays dimensional stable due to the high Tg of the material.

Polybutylene terephthalate (PBT) and/or polyethylene terephthalate (PET) provide the handle with high quality surface properties, including improved optical characteristics, and high impact strength. Once heated, a mixture of PBT and PET represent a high temperature-resistant melt having low viscosity and a high Melt Flow Index (MFI). Therefore, processability of the magnetic/ferromagnetic material during molding is improved.

It is known, that heavy resin materials tend to show high shrinkage effects for products having thick walls/dimensions. However, it has been surprisingly found out that glass fibers added to the magnetic/ferromagnetic material provide the material composition with improved stability and low shrinkage effects.

The material according to the present disclosure is an alternative to metal/zinc-die-cast material. The material of the disclosure enables to offer an attractive solution with respect to the manufacturing process according to the present disclosure, price and environment. This alternative allows the handle to have the look and feel in the final state like a metal product. At the same time the material of the present disclosure should be easily processable by injection molding and should save on the assembly effort. For example, for the process of the present disclosure there are three basic steps required: (1) injection molding of the handle 12; (2) two-component injection molding of hard material and/or soft material, e.g. to form a thumb rest; and (3) electroplating of the handle, e.g. to form a metal layer in the form of a ring 18. In contrast, when using a zinc-die-cast material five steps are needed: (1) manufacturing of the zinc-die-casted main part; (2) deflashing of the main part; (3) electroplating the main part; (4) separately producing a soft material part; (5) and assembling the main part with the separately produced soft material part. A lubricant may be added to the material to improve the molding processing fluidity.

Table 1 shows the flowability and heat transfer results of several different formulas/material compositions:

TABLE 1

| | Flowability and heat transfer | | | |
|---|---|---|---|---|
| Test-No. | 20% SAN 80% Iron oxide | 20% SAN 5% Aluminum oxide 75% Iron oxide | 15% SAN 10% Aluminum oxide 75% Iron oxide | 17% SAN 16% Aluminum oxide 67% Iron oxide |
| Specific weight [g/cm$^3$] | 2.91 | 2.95 | 2.99 | 3.06 |
| 1 | 21 | 16 | 13 | 9 |
| 2 | 20 | 16 | 13 | 9 |
| 3 | 20 | 16 | 13 | 10 |
| 4 | 21 | 16 | 13 | 9 |
| 5 | 20 | 16 | 14 | 9 |
| 6 | 20 | 16 | 13 | 8 |
| 7 | 20 | 16 | 13 | 9 |
| 8 | 20 | 16 | 13 | 9 |
| 9 | 20 | 16 | 13 | 9 |
| 10 | 20 | 16 | 13 | 9 |
| Average (cm) | 20.2 | 16 | 13.1 | 9 |

TABLE 1-continued

Flowability and heat transfer

| Test-No. | 20% SAN<br>80% Iron oxide | 20% SAN<br>5% Aluminum<br>oxide<br>75% Iron oxide | 15% SAN<br>10% Aluminum<br>oxide<br>75% Iron oxide | 17% SAN<br>16% Aluminum<br>oxide<br>67% Iron oxide |
|---|---|---|---|---|
| Content Al—Ox [%] | 0 | 5 | 10 | 16 |
| Heat transfer rate [W/m * K] | 0.87<br>0.89<br>0.88 | 0.96<br>1.06<br>1.01 | 1.2<br>1.22<br>1.23 | 1.43<br>1.41<br>1.44 |
| Average Value [W/m * K] | 0.88 | 1.01 | 1.21666667 | 1.42666667 |

Figure 13:
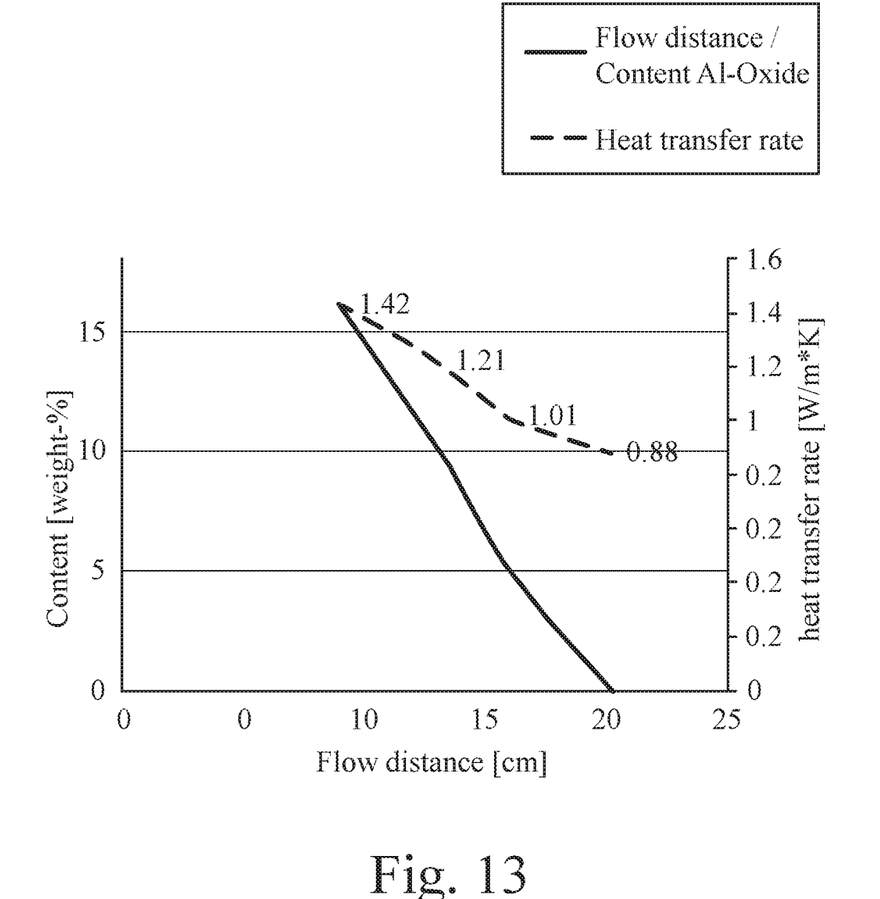
FIG. 13 is a graph showing average results of heat transfer and flow distance.

Graph 1, shown in FIG. 13, plots the average results of heat transfer and flow distance of the formulas from Table 1.

As can be seen, different fillers and different concentrations of fillers control the thermal conductivity or heat transmission and flowability of the material.

Test results revealed that the use of boron nitride or aluminum silicate showed very similar results to that of aluminum oxide depicted in Table 1 and Graph 1 above.

The heat energy and shear heating affect the fluidity of the heavy resin material, and thereby the process window for an effective injection molding process can be exactly controlled. Further, with the ability of the material of the present disclosure to fill any available cavities within the mold, it is possible to use the mass/weight distribution of the material for adaption of the inertial moment of the finished handle.

There are several advantages related to the material of the present disclosure: The handle manufactured with the material of the present disclosure looks and feels like a heavy metal handle and it is resistant to corrosion. The material also has manufacturing advantages and cost saving advantages with fast cycle times due to its heat transfer properties as compared to metal inserted or die-casted handles and products with assembled component parts. The material of the present disclosure requires less energy and other essential resources for manufacturing in comparison to zinc-die casted products.

In contrast to material compositions that are highly loaded with fillers, the magnetic/ferromagnetic material of the present disclosure shows optimized mechanical properties, in particular dimensional stability under heat and impact strength due to the improved melt viscosity and glass transition temperature.

The material of the present disclosure possesses the ability to adhere to other components/materials, e.g., substrates and resins, which is important for multicomponent injection molding, e.g. for molding handles comprising two or three different materials.

The handle or part of the handle may be electroplated to add improved appearance and a pleasant feel. Thermoplastic elastomers are well suited for electroplating as they allow for the creation of both, hard and soft composite components to be electroplated selectively in one operation.

For example, the handle may comprise a thumb rest being made from a thermoplastic elastomer material and/or from a polypropylene material. These materials can be easily injection molded over the heavy resin material as discussed above. Such thumb rest may provide the handle of the oral care implement with improved handling properties, e.g. with anti-slip properties to improve the maneuverability of the oral care implement under wet conditions, e.g. when the user brushes his teeth. The thumb rest may be made from thermoplastic elastomer having a Shore A hardness from about 30 to about 60, or about 40 to prevent the oral care implement from being too slippery when used in wet conditions. At least a portion of the thumb rest may have a concave shape with an angle α with respect to the area of the remaining portion of the thumb rest from about 20° to about 25°, or about 24°. The thumb rest or a gripping region may be attached onto the front surface of the handle in the region close to the proximal end, i.e. closest to the head. The thumb rest may comprise a plurality of ribs extending substantially perpendicular to the longitudinal axis of the oral care implement. Such ribs may allow users/consumers to use the oral care implement with even more control. The user/consumer can better grasp and manipulate the handle of the oral care implement during brushing. Such handle may provide further improved control and greater comfort during brushing, in particular under wet conditions.

Furthermore, the handle may be made from at least two, or at least three different materials, each forming different parts of the handle. For example, a first material according to the present disclosure, e.g. a magnetic and/or ferromagnetic material may be injection molded into a first component of the handle thereby forming an underlying base structure of the oral care implement. A second component, e.g. of polypropylene material may be injection molded over the first component, and/or a third component, e.g. of thermoplastic elastomer material may be injection molded over the first component and/or the second component.

The third component of thermoplastic elastomer material may form the thumb rest on the front surface of the oral care implement and/or a palm grip on the back surface being opposite the front surface to be gripped by the user's/consumer's fingers and thumb. Such handle configuration may even further resist slippage during use. The thermoplastic elastomer material may extend through an aperture provided in the underlying base structure and/or second component of the handle.

The tooth cleaning elements of the oral care implement, e.g. bundle of filaments forming one or a plurality of tufts, may be attached to the head by means of a hot tufting process. One method of manufacturing the head with tufts of filaments embedded in the head may comprise the following steps: In a first step, tufts are formed by providing a desired amount of filaments. In a second step, the tufts are placed into a mold cavity so that ends of the filaments which are supposed to be attached to the head extend into said cavity. The opposite ends of the filaments not extending into said cavity may be either end-rounded or non-end-rounded. For example, the filaments may be not end-rounded in case the filaments are tapered filaments having a pointed tip. In a third step the head is formed around the ends of the filaments extending into the mold cavity by an injection molding process, thereby anchoring the tufts in the head. Alternatively, the tufts may be anchored by forming a first part of the head—a so called "sealplate"—around the ends of the filaments extending into the mold cavity by an injection molding process before the remaining part of the oral care implement is formed. Before starting the injection molding process the ends of the tufts extending into the mold cavity may be optionally melted or fusion-bonded to join the filaments together in a fused mass or ball so that the fused masses or balls are located within the cavity. The tufts may be held in the mold cavity by a mold bar having blind holes that correspond to the desired position of the tufts on the finished head of the oral care implement. In other words, the tufts attached to the head by means of a hot tufting process are not doubled over a middle portion along their length and are not mounted in the head by using an anchor/staple. The tufts are mounted on the head by means of an anchor-free tufting process.

Alternatively, the head for the oral care implement may be provided with a bristle carrier having at least one tuft hole, e.g. a blind-end bore. A tuft comprising a plurality of filaments may be fixed/anchored in said tuft hole by a stapling process/anchor tufting method. This means, that the filaments of the tuft are bent/folded around an anchor, e.g. an anchor wire or anchor plate, for example made of metal, in a substantially U-shaped manner. The filaments together with the anchor are pushed into the tuft hole so that the anchor penetrates into opposing side walls of the tuft hole thereby anchoring/fixing/fastening the filaments to the bristle carrier. The anchor may be fixed in opposing side walls by positive and frictional engagement. In case the tuft hole is a blind-end bore, the anchor holds the filaments against a bottom of the bore. In other words, the anchor may lie over the U-shaped bend in a substantially perpendicular manner. Since the filaments of the tuft are bent around the anchor in a substantially U-shaped configuration, a first limb and a second limb of each filament extend from the bristle carrier in a filament direction. Filament types which can be used/are suitable for usage in a stapling process are also called "two-sided filaments". Heads for oral care implements which are manufactured by a stapling process can be provided in a relatively low-cost and time-efficient manner.

The following is a non-limiting discussion of example embodiments of oral care implements and parts thereof in accordance with the present disclosure, where reference to the Figures is made.

Figure 1:
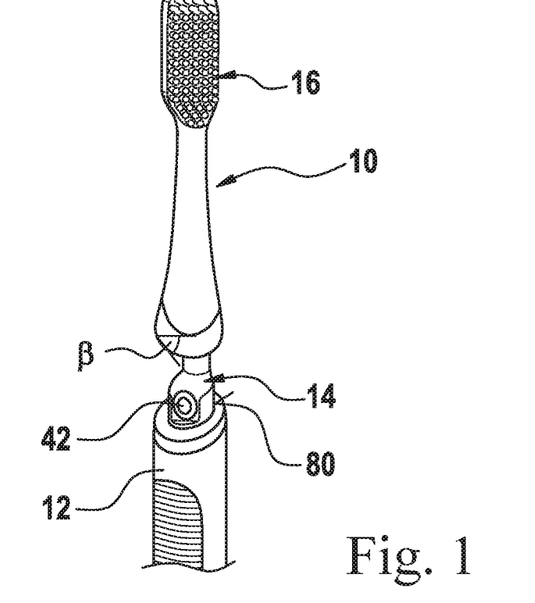
FIG. 1 shows a perspective view of an example embodiment of a manual oral care implement according to the present disclosure, the oral care implement comprising a head, a handle and a connector.
Figure 2:
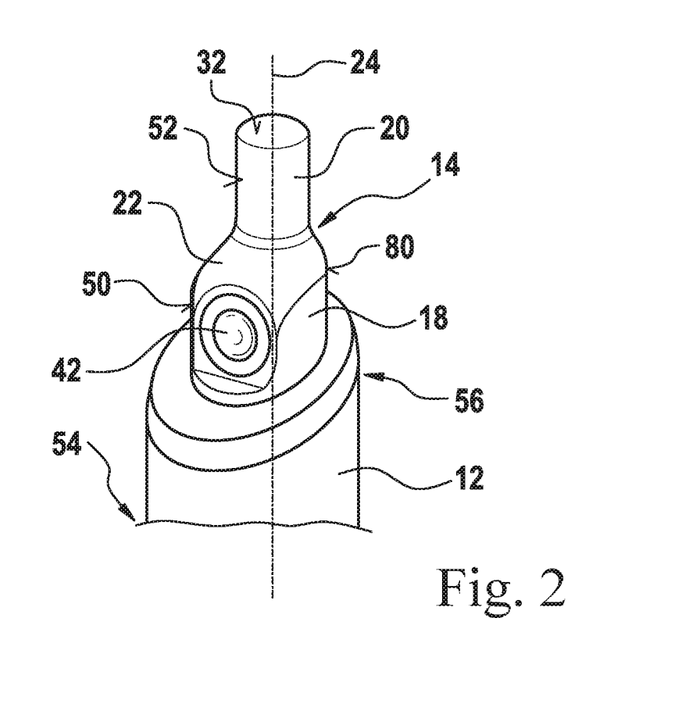
FIG. 2 shows a perspective view of the handle with connector of FIG. 1.
Figure 3:
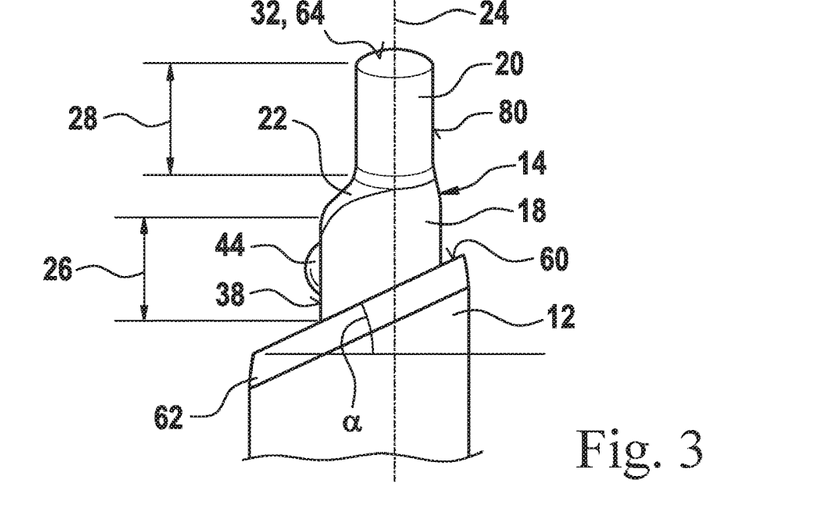
FIG. 3 shows a schematic side view of the handle with connector according to FIG. 2.
Figure 4:
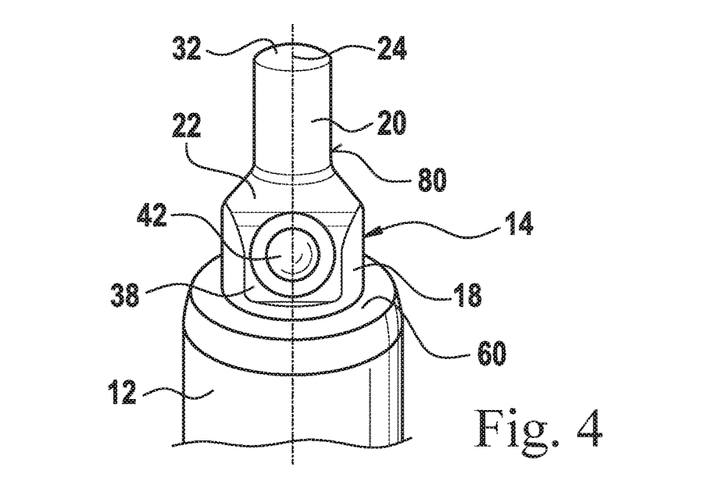
FIG. 4 shows a schematic front view of the handle with connector according to FIG. 2.
Figure 5:
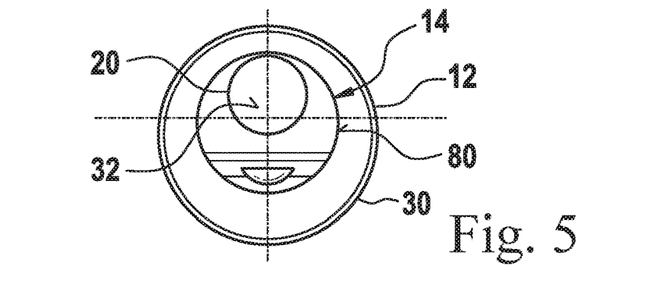
FIG. 5 shows a schematic top-down view of the handle with connector according to FIG. 2.

FIG. 1 shows a manual oral care implement 10, in this specific embodiment a manual toothbrush 10. The manual toothbrush 10 comprises a handle 12 to which a connector 14 is attached, and a brush head 16. The brush head 16 is repeatedly attachable to and detachable from the handle 12 via connector 14.

FIGS. 2 to 5 show a schematic perspective view, a side view, a front view and a top-down view of handle 12, respectively, handle 12 comprising connector 14. The connector 14 comprises a first substantially cylindrical section 18, a second substantially cylindrical section 20, and an at least partially conically shaped section 22 connecting the first and the second cylindrical sections 18, 20. The first substantially cylindrical section 18, the at least partially conically section 22 and the second substantially cylindrical sections 20 are arranged in consecutive order and define together a longitudinal length extension 24 of connector 14. The first substantially cylindrical section 18 and the second substantially cylindrical section 20 are placed off-center with respect to the longitudinal length extension 24 of the connector 14. As derivable from side view of FIG. 7, the first and the second substantially cylindrical sections 18, 20 have a first and a second longitudinal central axis 74, 76, respectively, which are defined as the symmetry axis of the first and the second substantially cylindrical sections 18, 20. The first and the second substantially cylindrical sections 18, 20 may be placed/arranged with respect to each other so that the second longitudinal central axis 76 of the second cylindrical section 20 is located off-center with respect to the first longitudinal central axis 74 of the first cylindrical section 18 by a distance 78 of about 1 mm to about 2.5 mm, or of about 1.5 mm to about 2 mm, or of about 1.65 mm. In other words, when seen in a side view (cf. FIGS. 3, 7 and 8), the central axis 76 of the second substantially cylindrical section 20 is offset/eccentric from the longitudinal central axis 74 of the first substantially cylindrical section 18 by a distance 78 of about 1 mm to about 2.5 mm, or of about 1.5 mm to about 2 mm, or of about 1.65 mm.

Figure 8:
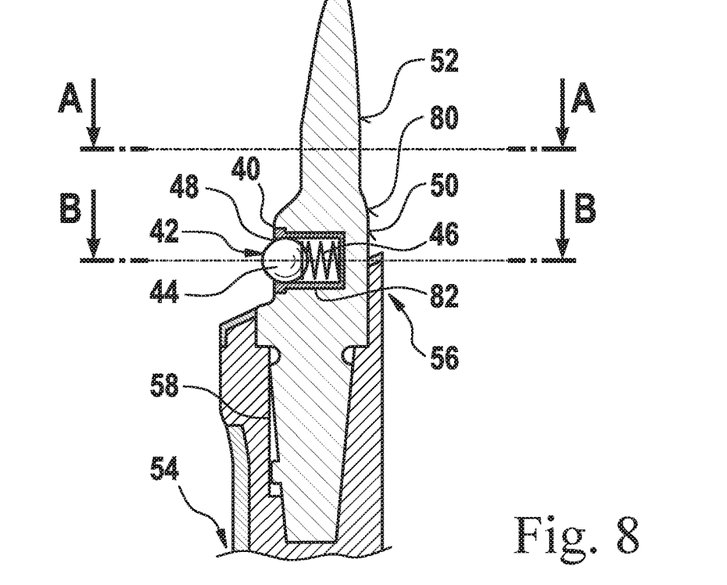
FIG. 8 shows a longitudinal cross-sectional view of the handle with connector of FIG. 2.
Figures 9, 10:
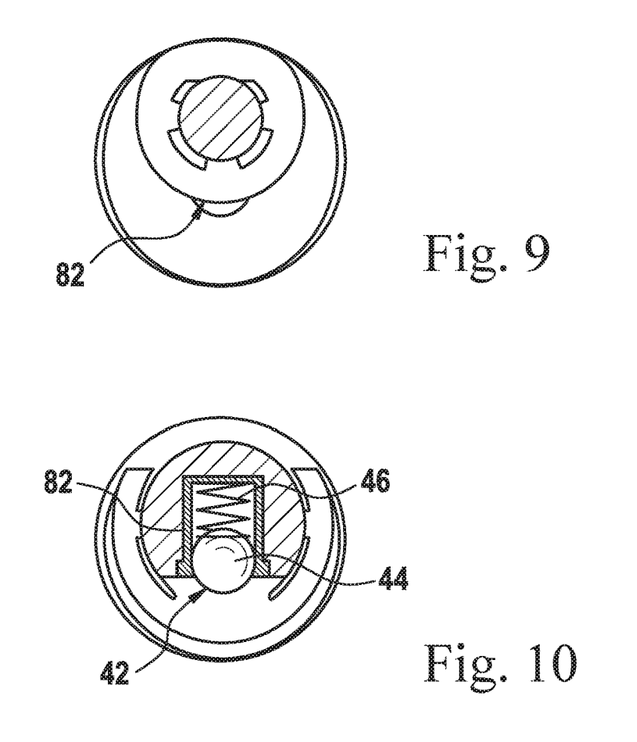
FIG. 9 shows the cross-sectional view along line A-A.
FIG. 10 shows the cross-sectional view along line B-B.

The handle 12 has a distal end 54 and a proximal end 56, the proximal end 56 being closest to a brush head 16 attachable to the handle 12. As shown in FIGS. 8 to 10, proximal end 56 of handle 12 comprising a hollow portion/recess 58 into which a portion of the first substantially cylindrical section 18 is fixed, e.g. by a press-fitting process and/or gluing.

The proximal end 56 of the handle 12 comprises a chamfered surface 60. The cross-sectional area 62 extending substantially perpendicular to the longitudinal length extension 64 and the chamfered surface 60 define an angle α from about 15° to about 30°, or from about 18° to about 28°, or about 25°.

Figure 6:
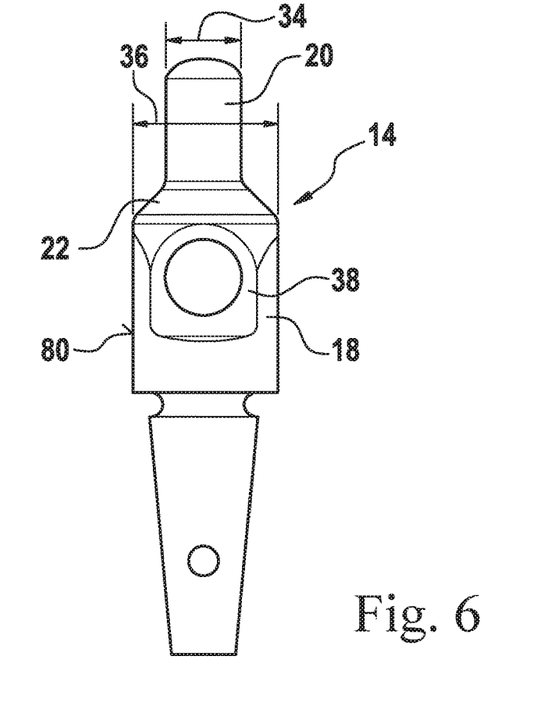
FIG. 6 shows a front view of an example embodiment of a connector according to the present disclosure.
Figure 7:
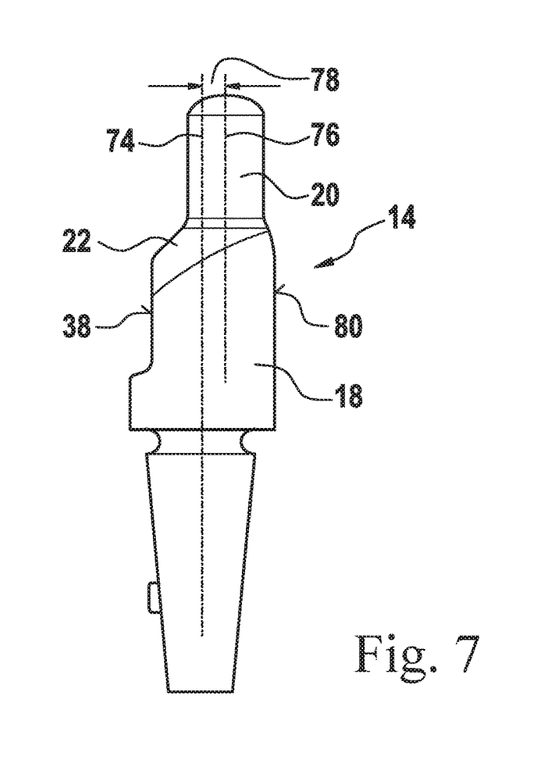
FIG. 7 shows a side view of the connector of FIG. 6.

FIGS. 6 and 7 show a schematic front and side view of connector 14, respectively. The first substantially cylindrical section 18 and the second substantially cylindrical section 20 have each a length extension 26, 28 and a cross-sectional area 30, 32 extending substantially perpendicular to the length extension 26, 28. The cross-sectional area 30 of the first substantially cylindrical section 18 and the second cross-sectional area 32 of the second substantially cylindrical section 20 is substantially circular. The first substantially cylindrical section 18 has a cross-sectional area 30 being greater than the cross-sectional area 32 of the second substantially cylindrical section 20. The first cross-sectional area 30 has a diameter 36 of about 8 mm to about 10 mm, or about 9 mm, while the second cross-sectional area 32 has a diameter 34 of about 4 mm to about 6 mm, or about 5 mm.

The first substantially cylindrical section 18 comprises a flattening portion 38 at the outer lateral surface 80 of connector 14. Flattening portion 38 extends along the length extension 26 of the first substantially cylindrical section 18. As further derivable from FIGS. 8 to 10, the flattening portion comprises a recess 40 which forms an inner cavity 82 within the connector 14. A spring-loaded ball element 42 is inserted into cavity 82 and is fixed therein, e.g. by a press-fitting process and/or gluing. The spring-loaded ball element 42 is an element with a snap-fit locking mechanism to provide sufficiently strong connection and stability between head 16 and handle 12 in an axial direction, i.e. along the longitudinal length extension 24 of the connector and oral care implement 10. The spring-loaded ball element 42 comprises a ball 44 and a spring 46, the spring 46 applying a radial force onto the ball 44 towards the outer circumference 48 and outer lateral surface 80 of connector 14. When the brush head 16 is attached to the handle, ball 44 extends slightly beyond the outer lateral surface of the first substantially cylindrical section 18 and arrests in a corresponding recess 70 provided in a hollow portion (66) of the head shaft (cf. FIGS. 11 and 12). Both, the spring 46 and the ball 44 may be made from stainless steel.

The first and the second substantially cylindrical sections 18, 20 have a first and a second outer lateral surface 50, 52, respectively, and the first and the second substantially cylindrical sections 18, 20 are arranged with respect to each other so that a part of the first outer lateral surface 50 and a part the second outer lateral surface 52 are substantially in straight alignment. The flattening portion 38 is arranged opposite the first and second outer surfaces 50, 52 being substantially in straight alignment.

Figure 11:
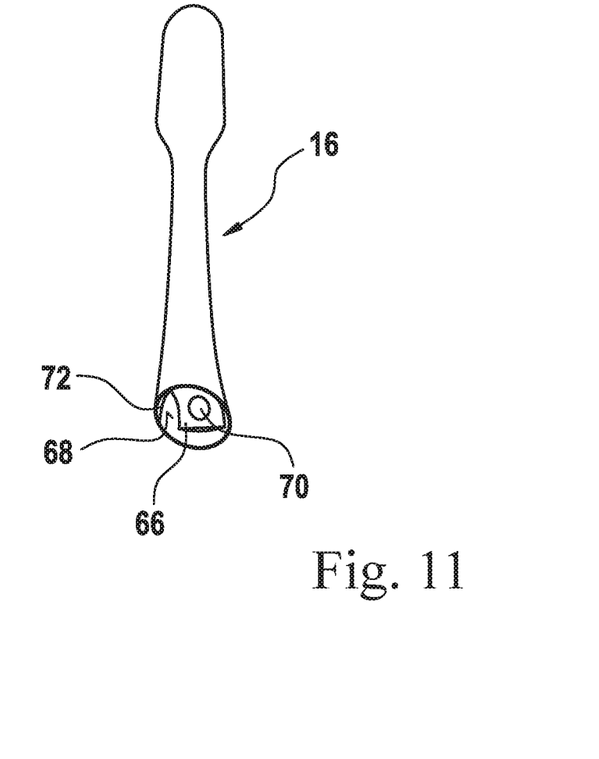
FIG. 11 shows a schematic perspective view of the head of the manual oral care implement of FIG. 1.
Figure 12:
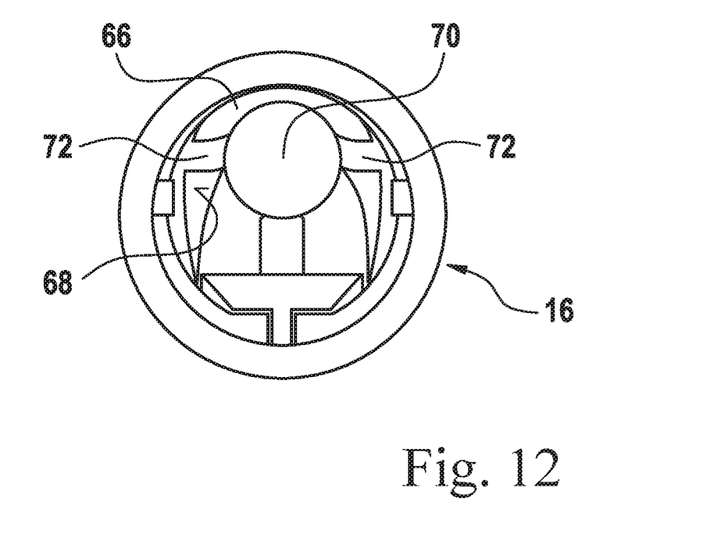
FIG. 12 shows a bottom view of the head of FIG. 11.

FIG. 11 shows a perspective view of brush head 16, and FIG. 12 a respective bottom view. Head 16 comprises hollow portion 66 for receiving the second substantially cylindrical section 20, the at least partially conically shaped section 22 and a part of the first substantially cylindrical section 18 of connector 14. Hollow portion 66 has an inner wall 68 comprising recess 70 for receiving a portion of ball 44 of the spring-loaded ball element 42. Inner wall 68 of hollow portion 66 further comprises two ribs 72 being arranged opposite each other for precisely adjusting the head 16 on the connector 14.

In the context of this disclosure, the term "substantially" refers to an arrangement of elements or features that, while in theory would be expected to exhibit exact correspondence or behavior, may, in practice embody something slightly less than exact. As such, the term denotes the degree by which a quantitative value, measurement or other related representation may vary from a stated reference without resulting in a change in the basic function of the subject matter at issue.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

What is claimed is:

1. A connector (14) for repeatedly attaching and detaching a head (16) to and from a handle (12) of a manual oral care implement (10), the connector (14) having an outer lateral surface (80) and a recess (40) therein, the recess (40) forming a cavity (82) within the connector (14), wherein the cavity (82) has therein a spring-loaded ball-snap element (42) comprising a ball (44) and a spring (46), the ball slightly extending beyond the outer lateral surface (80) of the connector (14), and the spring (46) applying a radial force onto the ball (44) in a direction towards the outer lateral surface (80) of the connector (14), wherein the connector is structured and configured such that repeatedly attaching and detaching the head (16) to and from the handle (12) is accomplished solely by pushing-in and pulling-out the head (16) in an axial direction, whereby the ball (44) engages and disengages a recess (70) provided in an inner wall (68) of the head (16), wherein a portion of the outer lateral surface (80) of the connector (14) from which the ball is slightly extending is flattened (38), and wherein the inner wall (68) of the hollow portion (66) of the head (16) comprises at least two ribs (72) arranged opposite each other, for adjusting the head (16) on the connector (14) and preventing compression of air in the hollow portion (66) of the head (16) when the head is being attached to the handle (12), wherein the connector comprises a first substantially cylindrical section having a first substantially cylindrical outer surface, a second substantially cylindrical section having a second substantially cylindrical outer surface, and an at least partially conical section therebetween, and wherein the flattened portion of the outer lateral surface (80) of the connector (14) from which the ball is extending is opposite to one of the first substantially cylindrical outer surface and the second substantially cylindrical outer surface and is adjacent to the at least partially conically shaped section.

2. The connector (14) of claim 1, wherein the first substantially cylindrical section (18), the second substantially cylindrical section (20), and the at least partially conically shaped section (22) define a longitudinal length extension (24) of the connector (14), wherein the first substantially cylindrical section (18) and the second substantially cylindrical section (20) are placed off-center with respect to the longitudinal length extension (24).

3. The connector (14) of claim 2, wherein each of the first substantially cylindrical section (18) and the second substantially cylindrical section (20) has a length extension (26, 28) and a cross-sectional area (30, 32) extending substantially perpendicular to the length extension (26, 28), and wherein at least one of the cross-sectional areas (30) of the first substantially cylindrical section (18) and the second substantially cylindrical section (20) is substantially circular.

4. The connector (14) of claim 2, wherein the first substantially cylindrical section (18) has a cross-sectional area (30) that is greater than the cross-sectional area (32) of the second substantially cylindrical section (20).

5. The connector (14) of claim 2, wherein the first and second substantially cylindrical sections (18, 20) have a first and a second outer lateral surface (50, 52), respectively, and the first and second substantially cylindrical sections (18, 20) are arranged with respect to each other so that a part of the first outer lateral surface (50) and a part the second outer lateral surface (52) are substantially in straight alignment.

6. The connector (14) of claim 1, wherein the flattened portion (38) is arranged opposite to the first and second outer surfaces (50, 52) being substantially in straight alignment.

7. A handle (12) for a manual oral care implement (10), the handle (12) comprising the connector (14) of claim 1.

8. The handle (12) of claim 7, wherein the handle (12) has a distal end (54) and a proximal end (56), the proximal end (56) being closest to a head (16) attachable to the handle (12), wherein the proximal end (56) of the handle (12) comprises a hollow portion (58) into which a portion of the first substantially cylindrical section (18) is inserted.

9. The handle (12) of claim 8, wherein the proximal end (56) comprises a chamfered surface (60), wherein the handle (12) having a longitudinal length extension (64) and a cross-sectional area (62) extending substantially perpendicular to the longitudinal length extension (64), and wherein the chamfered surface (60) and the cross-sectional area (62) define an angle α from about 15° to about 30°.

10. A manual oral care implement (10) comprising the head (16) and the handle (12) with the connector (14) of claim 7, the head (16) being structured and configured to be repeatedly attachable to and detachable from the handle (12) via the connector (14).

11. The manual oral care implement (10) of claim 10, wherein the head (16) comprises a hollow portion (66) for receiving the second substantially cylindrical section (20), the at least partially conically shaped section (22), and a portion of the first substantially cylindrical section (18).

12. The manual oral care implement (10) of claim 11, wherein the hollow portion (66) of the head (16) comprises the inner wall (68) comprising the recess (70) for receiving the ball (44) of the spring-loaded ball element (42).

13. The handle (12) of claim 9, wherein the angle α is from about 18° to about 28°.

14. The handle (12) of claim 9, wherein the angle α is about 25°.

\* \* \* \* \*